(12) United States Patent
Osaki et al.

(10) Patent No.: US 9,366,782 B2
(45) Date of Patent: Jun. 14, 2016

(54) METHOD FOR MANUFACTURING A COMPONENT

(71) Applicant: Toyo Gosei Co., Ltd., Ichikawa-shi, Chiba (JP)

(72) Inventors: Takeshi Osaki, Ichikawa (JP); Yuki Kawakami, Inzai (JP)

(73) Assignee: Toyo Gosei Co., Ltd., Ichikawa-shi, Chiba (JP)

( * ) Notice: Subject to any disclaimer, the term of this patent is extended or adjusted under 35 U.S.C. 154(b) by 0 days.

(21) Appl. No.: 14/251,461

(22) Filed: Apr. 11, 2014

(65) Prior Publication Data

US 2014/0309393 A1    Oct. 16, 2014

Related U.S. Application Data

(60) Provisional application No. 61/810,981, filed on Apr. 11, 2013.

(51) Int. Cl.
| | | |
|---|---|---|
| *C08F 136/20* | (2006.01) | |
| *C08F 236/20* | (2006.01) | |
| *G02B 1/04* | (2006.01) | |
| *B29D 11/00* | (2006.01) | |
| *C08L 35/02* | (2006.01) | |

(52) U.S. Cl.
CPC . *G02B 1/041* (2013.01); *G02B 1/04* (2013.01)

(58) Field of Classification Search
CPC ....... G02B 1/041; C08L 35/02; C08F 136/20; C08F 236/20
USPC ............... 264/1.32, 496; 526/282; 522/93, 96
See application file for complete search history.

(56) References Cited

U.S. PATENT DOCUMENTS

| 8,084,545 | B2 * | 12/2011 | Takawaki et al. ............. 525/286 |
|---|---|---|---|
| 2012/0021180 | A1 * | 1/2012 | Miyake et al. ................ 428/156 |
| 2012/0329899 | A1 * | 12/2012 | Kawabe et al. ................ 522/33 |
| 2015/0018445 | A1 * | 1/2015 | Iizuka et al. ................... 522/33 |

FOREIGN PATENT DOCUMENTS

| EP | 1 113 903 B1 | | 11/2002 |
|---|---|---|---|
| JP | 8-3267 A | * | 1/1996 |
| JP | 2007-284650 A | * | 11/2007 |
| JP | 2012-251032 | | 12/2012 |

OTHER PUBLICATIONS

Online translation of JP 8-3267A, published Jan. 1996.*
Online translation of JP 2007-284650A, published Nov. 2007.*
What is Polyurethane? http://www.tosoheurope.com/our-products/polyurethanes (single page, undated).

* cited by examiner

*Primary Examiner* — Fred M Teskin
(74) *Attorney, Agent, or Firm* — TraskBritt, P.C.

(57) ABSTRACT

Described is a resinous article of manufacture that is wrinkle-resistant and is warpage-resistant when subjected to very high temperatures. Such an article is useful as an optical lens.

18 Claims, 3 Drawing Sheets

METHOD FOR MANUFACTURING A COMPONENT

CROSS-REFERENCE TO RELATED APPLICATION

This application claims the benefit under 35 U.S.C. §119 (e) of U.S. Provisional Patent Application Ser. No. 61/810,981, filed Apr. 11, 2013, the disclosure of which is hereby incorporated herein in its entirety by this reference.

TECHNICAL FIELD

Several aspects of the disclosure relate generally to the field of chemistry and the manufacture of components. The disclosure more particularly relates to resins having a small thermal deformation.

BACKGROUND

Resins have excellent characteristics such as resistance to impact, light permeability, and lightweight properties. Thus, resins are potentially useful for devices themselves and components constituting devices. However, resins are generally liable to be thermally-deformed.

Optical materials for radically curable compositions suitable for cast molding are disclosed in JP 2012-251032A (Dec. 20, 2012), the contents of the entirety of which are incorporated herein by this reference.

BRIEF SUMMARY

Therefore, a purpose of an aspect of the disclosure is to obtain resins having a small thermal deformation, compositions for formation of such resins, and components and devices formed by using such compositions and resins.

A method for manufacturing a component relating to an aspect hereof includes: a first step of preparing at least a first precursor bearing a first alkyl group that includes at least one cyclic moiety; and a second step of forming a resin by curing at least the first precursor in a state in which the first precursor is sandwiched between a first member and a second member. Components with small thermal deformation can be obtained by using a compound bearing an alkyl group that includes at least one cyclic moiety as a constituent of a precursor for resin.

With the method, it is preferred that a pencil hardness of the resin being less than or equal to 2 H. This enables the processing accuracy of the resin to be improved by mechanical process such as singulation.

With regard to the method, it is preferred that the resin constitutes the component.

With regard to the method, it is preferred that the first alkyl group includes two cyclic moieties.

With regard to the method, it is preferred that the first alkyl group be a bicyclic alkyl group. Thermal deformation is more suppressed by using a compound having bicyclic alkyl group as a constituent of a precursor.

With regard to the method, it is preferred that the method further include: preparing a second precursor bearing a second alkyl group that includes at least one cyclic moiety.

With regard to the method, it is preferred that the resin is formed such that the resin does not have wrinkles of which an average gap is greater than or equal to 300 μm.

With regard to the method, it is preferred that the resin has a property that no warpage of which gap is greater than or equal to 1 mm occurs by heating the resin at 373 K for 16 hours.

With regard to the method, it is preferred that the first precursor bears at least one polymerizable substituent attached to the first alkyl group.

With regard to the method, it is preferred that the first precursor bears two polymerizable substituents attached to the first alkyl group.

A component relating to an aspect of the disclosure includes: a resin that has a first alkyl group including at least one cyclic moiety.

With regard to the component, it is preferred that the first alkyl group has at least two cyclic moieties.

With regard to the component, it is preferred that the component is a lens, such as an optical lens.

With regard to the component, it is preferred that the component having no wrinkles of which average gap is greater than or equal to 300 μm.

With regard to the component, it is preferred that the component has a property that no warpage of which gap is greater than or equal to 1 mm occurs by heating the component at 373 K for 16 hours.

A composition for forming a resin relating to an aspect of the disclosure includes: a first precursor bearing a first alkyl group that has at least one cyclic moiety.

With regard to the composition, it is preferred that the first alkyl group includes at least two cyclic moieties.

With regard to the composition, it is preferred that the first alkyl group is a bicyclic alkyl group.

With regard to the composition, it is preferred that further includes: a second precursor bearing a second alkyl group that has at least one cyclic moiety.

With regard to the composition, it is preferred that each of the first alkyl group and the second alkyl group is a bicyclic alkyl group.

With regard to the composition, it is preferred that the first precursor have two polymerizable substituents attached to the first alkyl group, and the first precursor have no polymerizable substituent other than the two polymerizable substituents.

A resin relating to an aspect of the disclosure includes: a first cyclic alkyl group; and a second cyclic alkyl group. With regard to the resin, it is preferred that a pencil hardness of the resin is less than or equal to 2 H. This enables the processing accuracy of the resin to be improved by mechanical process such as singulation.

A method manufacturing a component relating to an aspect of the disclosure includes: preparing a first precursor bearing a first cyclic alkyl group and a second precursor bearing a second cyclic alkyl group; and forming a resin by curing the first precursor and the second precursor in a state in which the first precursor and the second precursor is sandwiched between a first member and a second member.

With the method, it is preferred that a pencil hardness of the resin be less than or equal to 2 H. This enables the processing accuracy of the resin to be improved by mechanical process such as singulation.

A method for manufacturing a component is disclosed herein includes: preparing a first precursor bearing a first alkyl group that includes at least one cyclic moiety; and forming a resin by curing the precursor in a state where it is sandwiched between first and second members.

BRIEF DESCRIPTION OF THE DRAWINGS

In the drawings, which illustrate what is currently considered to be the best mode for carrying out the disclosure.

DETAILED DESCRIPTION

Figure 1:
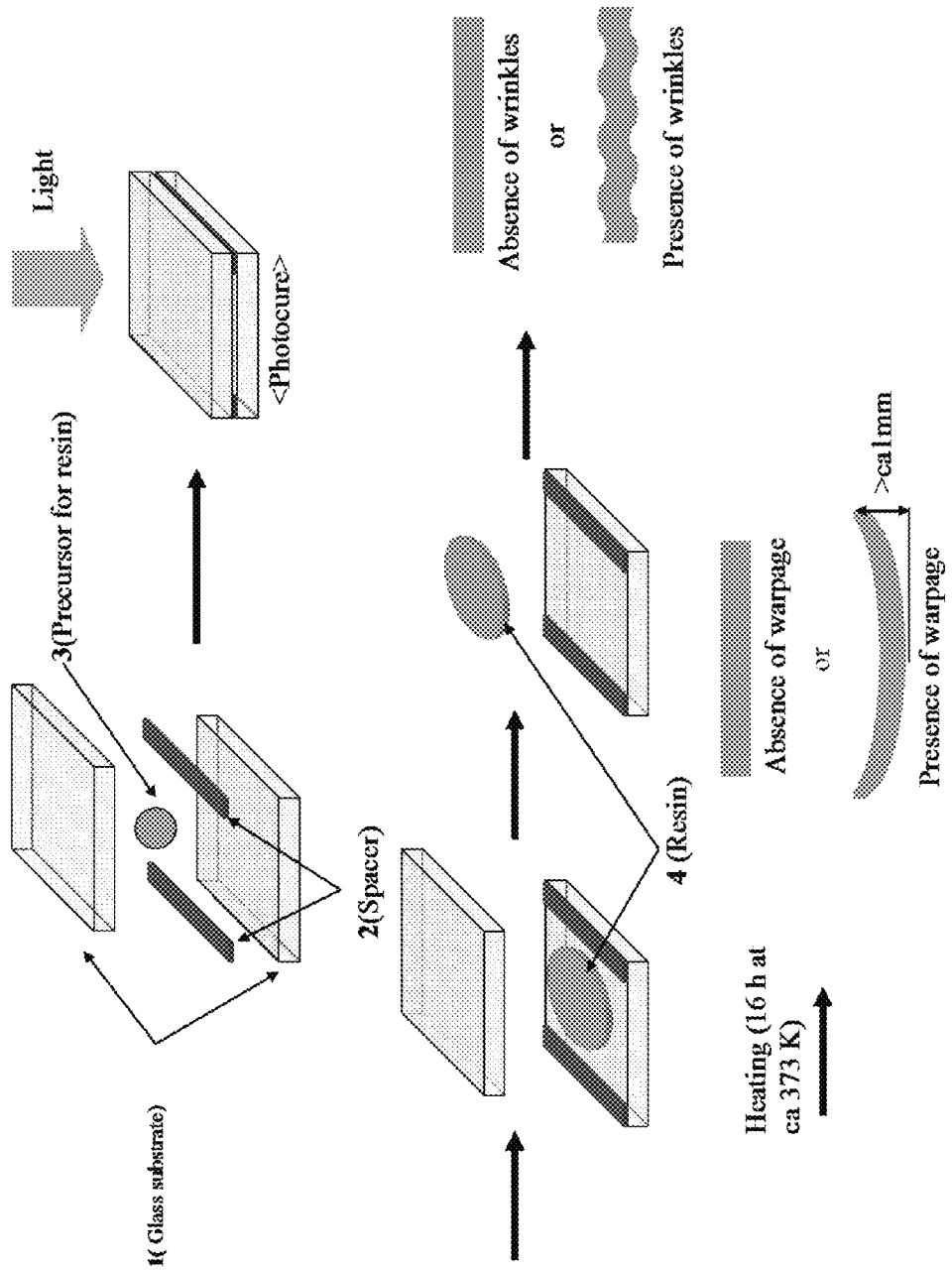
FIG. 1 shows the experimental procedure for observation of presence or absence of wrinkles and warpage.

Experimental Procedures:

FIG. 1 shows the experimental procedure for observation of surface of resin mold.

The experimental procedure is as follows:

A composition for resin is disposed on a glass substrate.

Precursor for resin 3 is sandwiched between two Glass substrates 1 between which Spacers 2 are disposed to create space between two Glass substrates 1. Resin 4 is formed by irradiation of the Precursor for resin 3 with a light transmitted through one of Glass substrates 1. Precursor 3 is cured for a time period and at a sufficient level of irradiation to a resin state having a particular degree of hardness.

After Resin 4 is released from Glass substrates 1, the presence or absence of wrinkles of Resin 4 is determined. If wrinkles of which the average gap is observed to be greater than ca 300 μm is observed, it is determined that Resin 4 has wrinkles.

Subsequently, Resin 4 is heated at 373 K for 16 hours. If a warpage of which gap is observed to be greater than ca 1 mm, it is determined that Resin 4 has a warpage.

Results:

Table 1 shows compositions and the presence or absence of wrinkles and warpage. All of A-DCP, DCP, 2IP, and 2NB have cyclic alkyl groups while 1,9ND-A has no cyclic alkyl group but has a linear alkyl group. In other words, precursors included in the compositions 1-4 have cyclic alkyl group while the precursor included in the composition 5 has a linear alkyl group.

TABLE 1

Constituents (ratio by weight) of compositions and the presence or absence of wrinkles and warpage.

| | Composition 1 | Composition 2 | Composition 3 | Composition 4 | Composition 5 |
|---|---|---|---|---|---|
| A-DCP | 100 | | 50 | 50 | |
| DCP | | 100 | | | |
| 2IP | | | 50 | | |
| 2NB | | | | 50 | |
| 1,9ND-A | | | | | 100 |
| IRG184 | 1 | 1 | 1 | 1 | 1 |
| Presence (P) or absence (A) of wrinkles | A | A | A | A | P |
| Presence (P) or absence (A) of warpage | A | A | A | A | P |

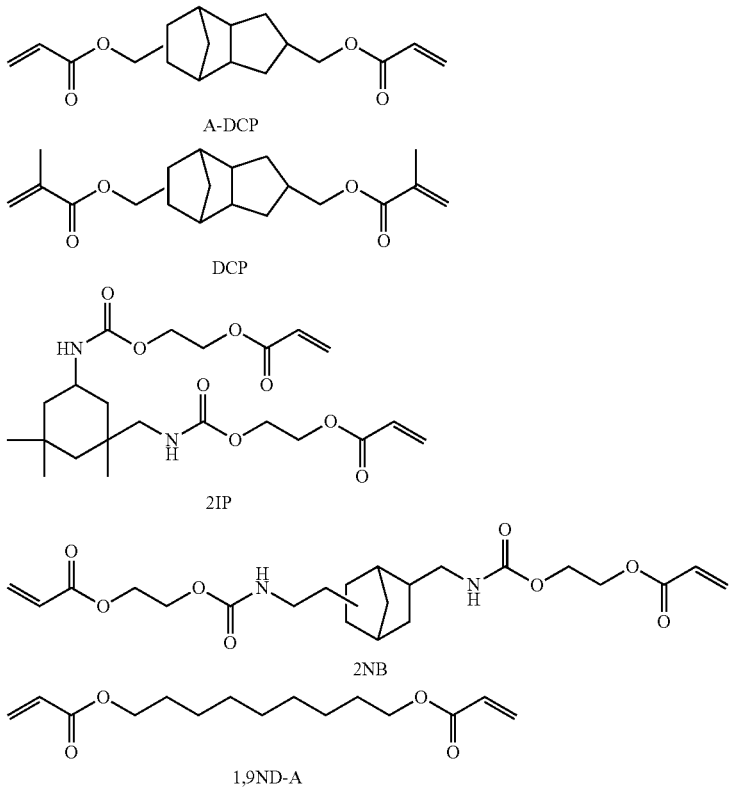

TABLE 1-continued

Constituents (ratio by weight) of compositions and the presence or absence of wrinkles and warpage.

| | Composition 1 | Composition 2 | Composition 3 | Composition 4 | Composition 5 |

IRG 184

As can be determined from Table 1, neither wrinkles nor warpage is observed for the resins obtained by curing the compositions 1-4, while both wrinkles and warpage are observed for the resin obtained by curing the composition 5. The results indicate that cyclic alkyl groups provide resistance to deformation. The pencil hardness of the resins obtained by curing the compositions 1-4 that include cyclic moieties is less than or equal to 2H.

In certain embodiments, instead of the Initiator IRG 184, for example, acetophenone-based initiators, alkylphenone-based initiators, benzoin-based initiators, benzyl ketal-based initiators, anthraquinone-based initiators, acyloxime-based initiators, and acyl phosphine oxide-based initiators can be used for curing the precursors.

The resins obtained by curing a monomer having a cyclic alkyl group can be applied to optical components, which require smooth surface and resistance to thermal deformation. Especially, the resins are suitable for use for lenses in mobile devices such as cell-phone, which are used in huge variety of temperatures.

Figure 2:
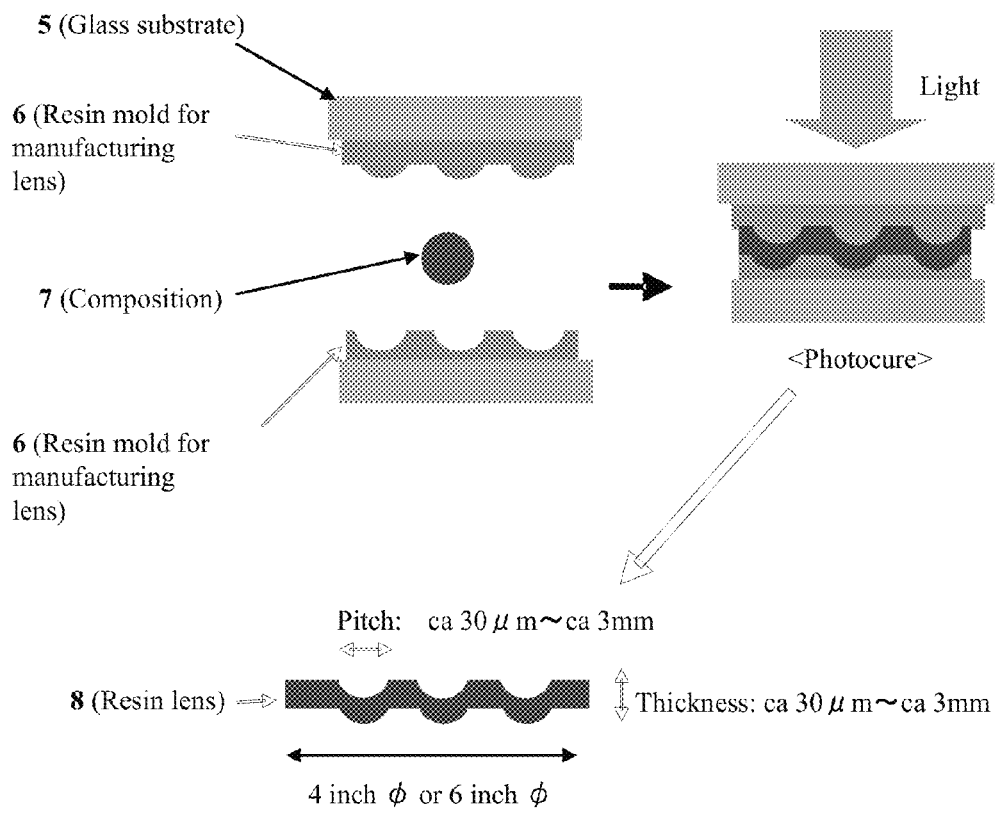
FIG. 2 shows the manufacturing process of the lens using any one of compositions relating to an aspect of the disclosure.

FIG. 2 shows the manufacturing process of lens using the compositions 1-4.

Two Resin molds for manufacturing lens 6 each of which is attached to Glass substrate 5 is prepared. Composition 7, which is any one of the compositions 1-4, is shown in Table 1 is sandwiched between two Resin molds for manufacturing lens 6. Resin lens 8 is formed by an irradiation of Composition 7 with a light transmitted through one of Glass substrates 5 and one of Resin molds for manufacturing lens 6. Dimensions such as pitch, thickness and diameter are shown in FIG. 2.

The lens obtained by the manufacturing process has a substantial absence of objectionable wrinkles and heightened resistance to thermal deformation.

Figure 3:
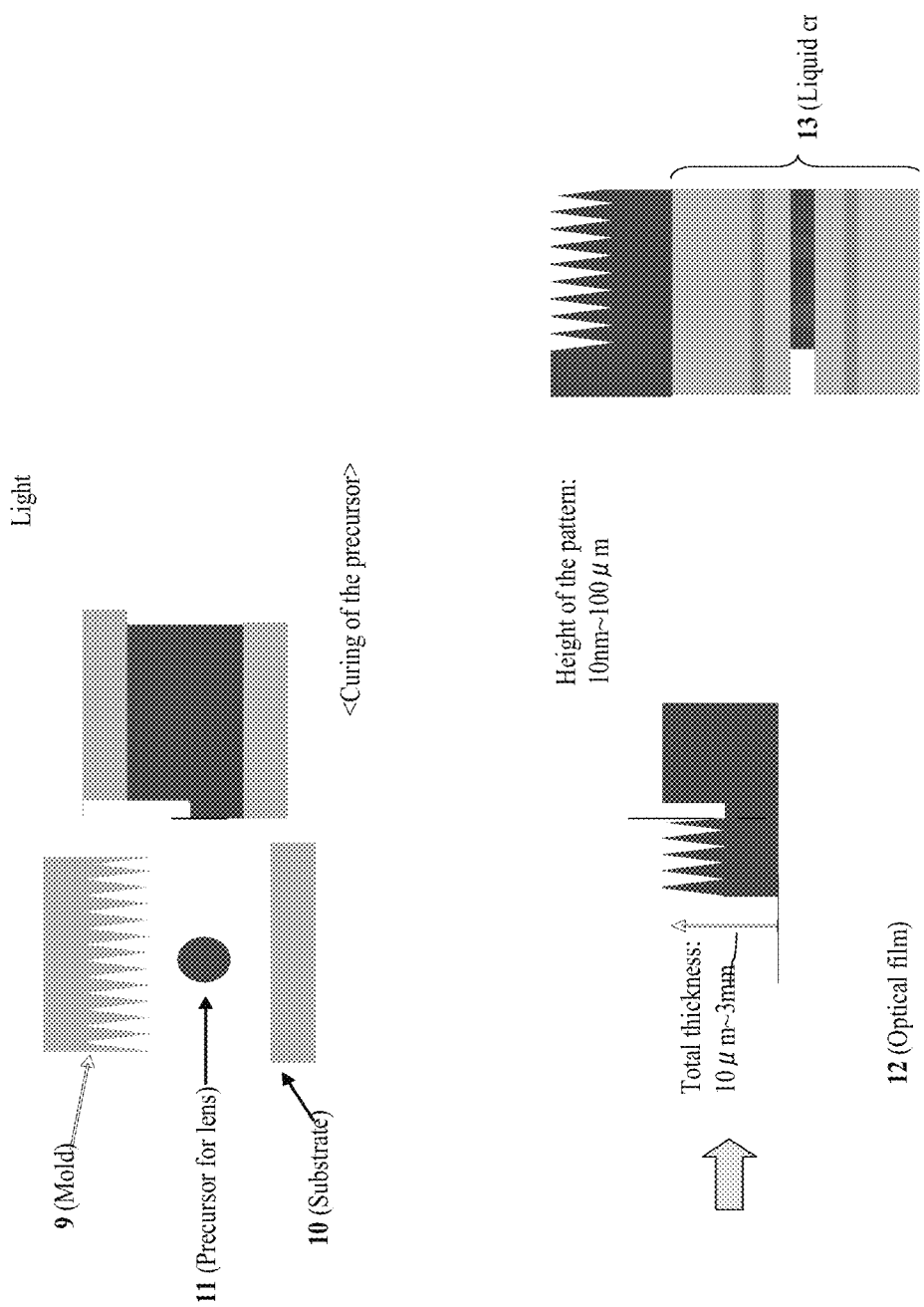
FIG. 3 shows the manufacturing process of optical film such as antireflection film using any one of compositions relating to an aspect of the disclosure.

FIG. 3 shows the manufacturing process of optical film such as antireflection film using the compositions 1-4.

Mold 9 and Substrate 10 are prepared. Precursor for film 11 is disposed between Mold 9 and Substrate 10. Optical film 12 is formed by an irradiation of Precursor 11 with a light transmitted through one of Mold 9 and Substrate 10. After Optical film 12 is released from Mold 9 and Substrate 10, Optical film 12 is attached to liquid crystal display (LCD) 13. Optical film 12 can be used as an optical film for other electro-optical devices such as electroluminescence device and electrophoretic device.

What is claimed is:

1. A method for manufacturing a component, the method comprising:
   preparing a first precursor bearing a first alkyl group and at least two polymerizable (meth)acryloyloxy substituents attached to the first alkyl group, wherein the first alkyl group includes at least one first cyclic moiety being tricyclodecane;
   preparing a second precursor bearing a second alkyl group and two substituents, wherein the second alkyl group includes at least one second cyclic moiety being cyclohexane or dicyclopentane, and the two substituents include —NH—C(=O)—O—CH$_2$CH$_2$—O— group and an acryloyl group;
   preparing a composition comprising at least the first precursor and the second precursor; and
   forming a resin by curing the composition in a state in which the composition is sandwiched between a first member and a second member.

2. The method according to claim 1, wherein the resin constitutes the component.

3. The method according to claim 1, wherein the first alkyl group includes two cyclic moieties.

4. The method according to claim 1, wherein the first alkyl group is a bicyclic alkyl group.

5. The method according to claim 1, wherein the second precursor is an urethane acrylate.

6. The method according to claim 1, wherein the resin is formed such that the resin does not have wrinkles of which the average gap is greater than or equal to 300 µm.

7. The method according to claim 1, wherein the resin has a property that no warpage of which gap is greater than or equal to 1 mm occurs by heating the resin at 373 K for 16 hours.

8. The method according to claim 1, wherein the component has a property that no warpage of which gap is greater than or equal to 1 mm occurs by heating the component at 373 K for 16 hours.

9. A component comprising:
   a resin that includes a first alkyl group, a second alkyl group, and at least one —NH—C(=O)—O—CH$_2$CH$_2$—O—C(=O)—, wherein:
   the first alkyl group includes at least one first cyclic moiety that is tricyclodecane, and
   the second alkyl group includes at least one second cyclic moiety that is cyclohexane or dicyclopentane.

10. The component of claim 9, wherein the first alkyl group has at least two cyclic moieties.

11. The component of claim 9, wherein the component is a lens.

12. The component of claim 9, wherein the component has no wrinkles of which average gap is greater than or equal to 300 µm.

13. A composition for forming a resin, the composition comprising:
   a first precursor bearing a first alkyl group and at least two polymerizable (meth)acryloyloxy substituents attached to the first alkyl group, wherein the first alkyl group includes at least one first cyclic moiety being tricyclodecane; and a second precursor bearing a second alkyl group and two substituents, wherein:
the second alkyl group includes at least one second cyclic moiety being cyclohexane or dicyclopentane, and
the two substituents each include —NH—C(=O)—O—CH$_2$CH$_2$—O— group and an acryloyl group.

14. The composition of claim 13, wherein the first alkyl group includes at least two cyclic moieties.

15. The composition of claim 13, wherein the first alkyl group is a bicyclic alkyl group.

16. The composition according to claim 13, wherein the second precursor is an urethane acrylate.

17. The composition of claim 13, wherein each of the first alkyl group and the second alkyl group is a bicyclic alkyl group.

18. A resin, comprising:
a first cyclic alkyl group that includes at least one first cyclic moiety that is tricyclodecane;
a second cyclic alkyl group that includes at least one second cyclic moiety that is cyclohexane or dicyclopentane; and
at least one —NH—C(=O)—O—CH$_2$CH$_2$—O—O—C(=O)— bond,
wherein the resin has a pencil hardness of less than or equal to 2 H, and the resin is obtained by curing the composition of claim 13.

* * * * *